Aug. 2, 1938. C. W. JOHNSON 2,125,789
METHOD OF MANUFACTURING GLASSWARE
Filed Nov. 12, 1934 3 Sheets-Sheet 1
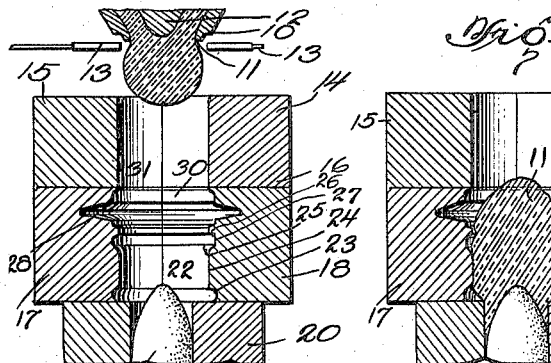
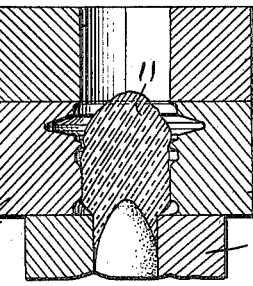
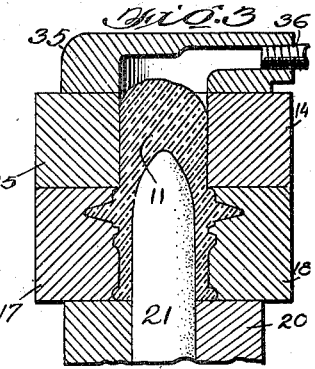
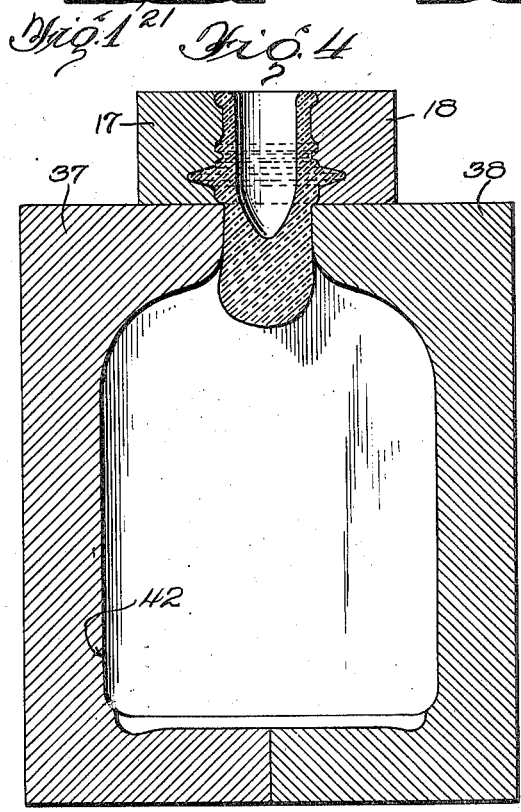
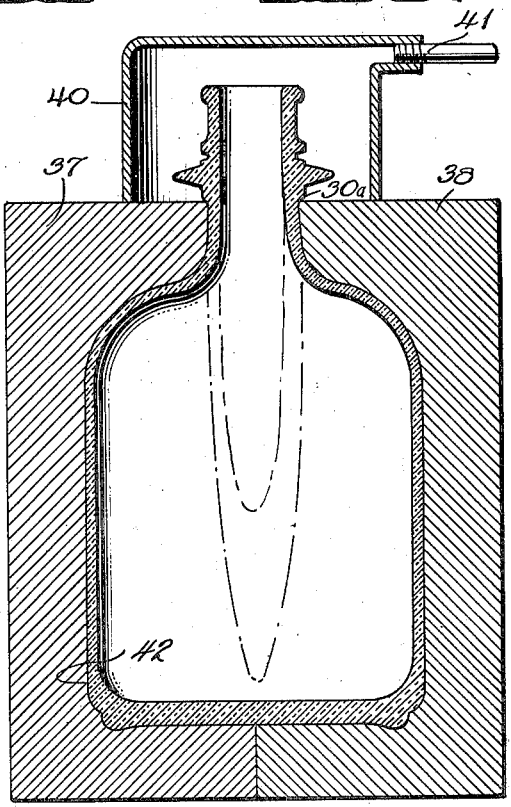
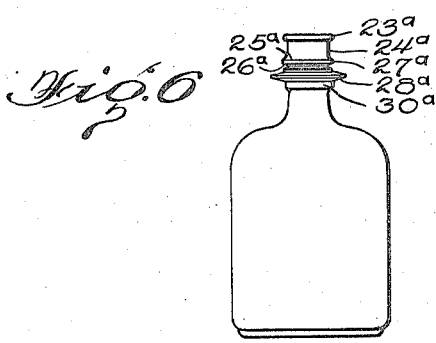
Inventor
Charles W. Johnson
By Blair Kilcoyne
Attorneys

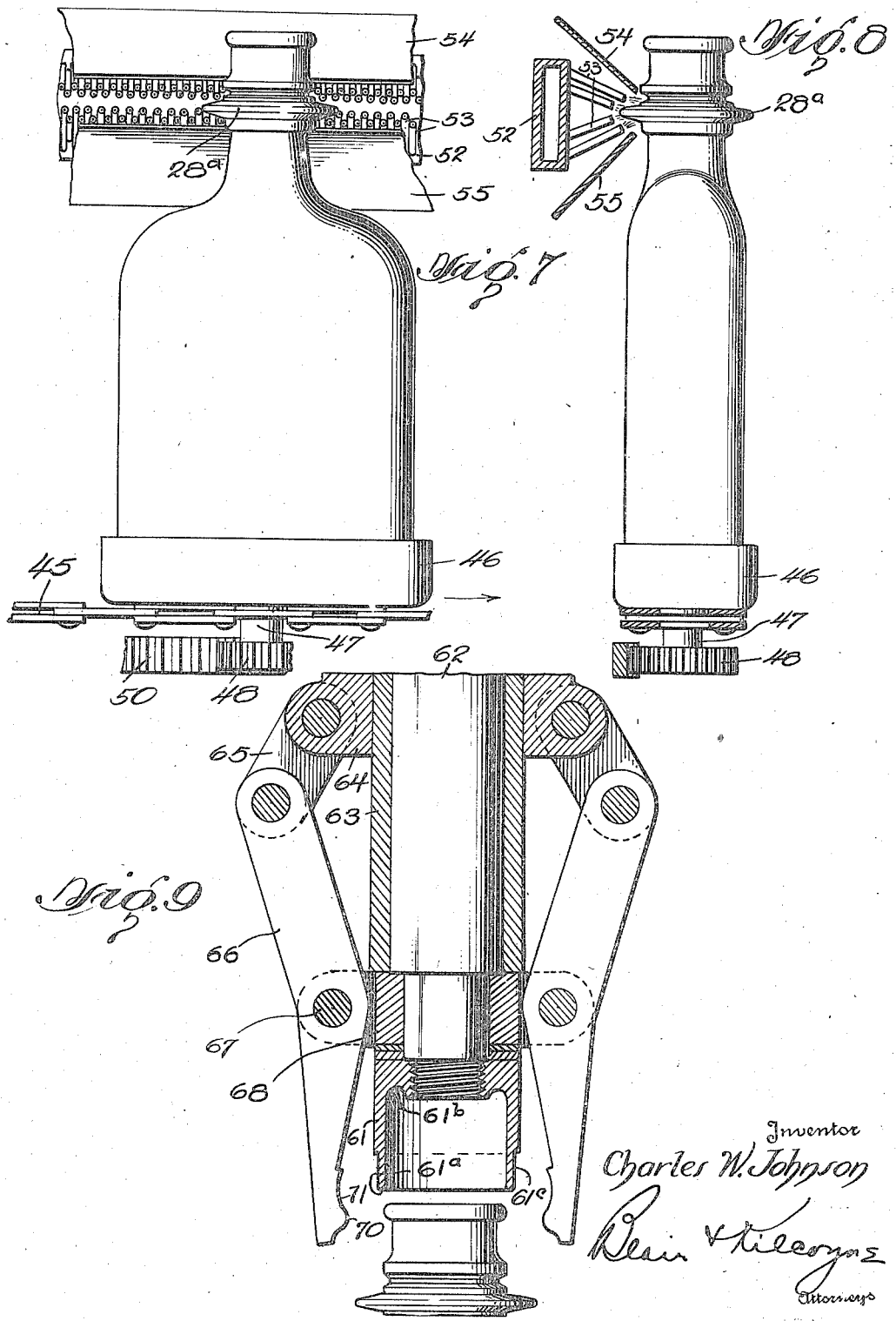

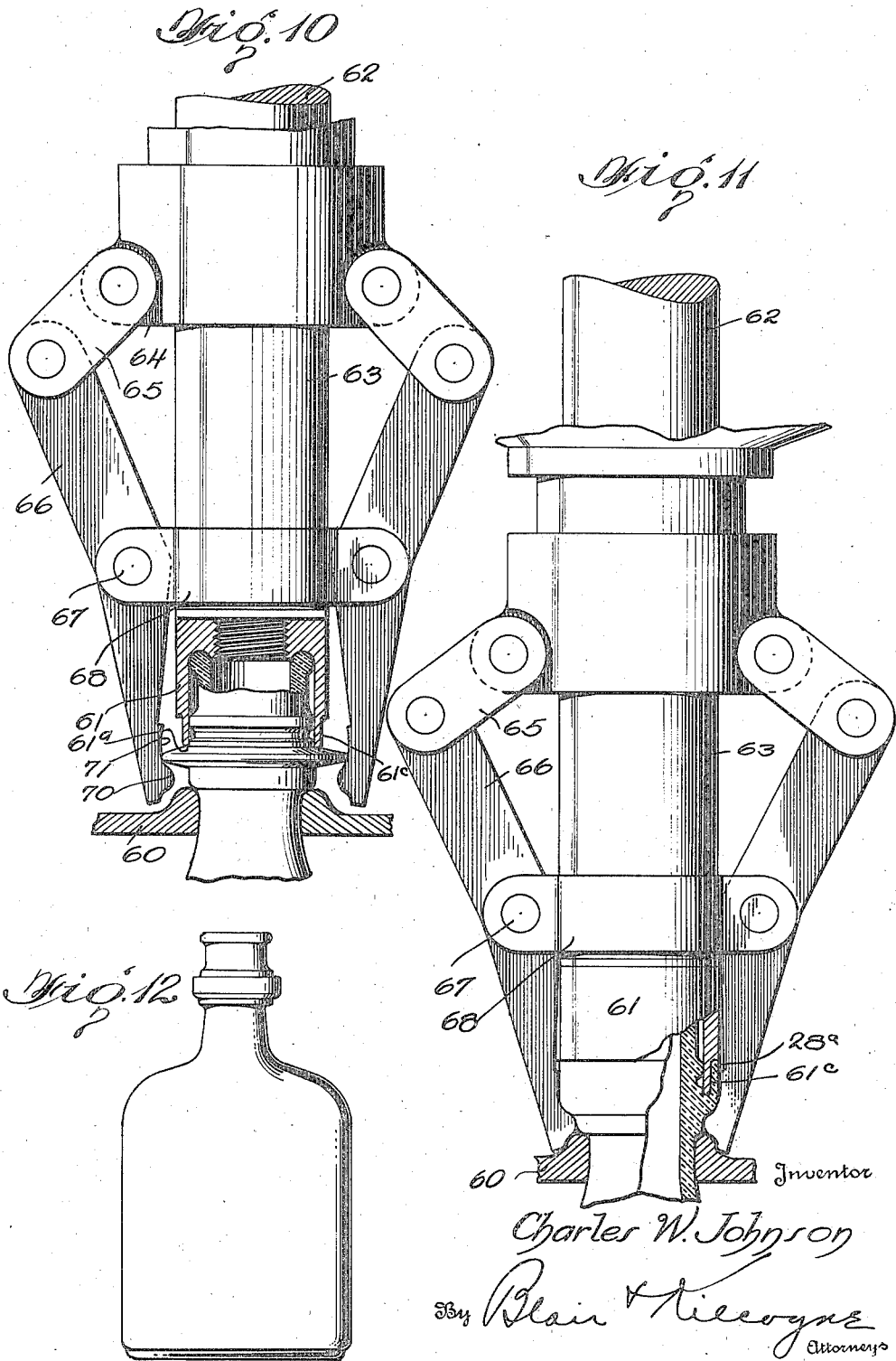

Patented Aug. 2, 1938

2,125,789

UNITED STATES PATENT OFFICE 2,125,789

METHOD OF MANUFACTURING GLASSWARE

Charles W. Johnson, Uniontown, Pa.

Application November 12, 1934, Serial No. 752,757

3 Claims. (Cl. 49—84)

This invention relates to glassware and the method of manufacturing the same.

While not limited thereto, the present invention provides a novel method of manufacturing hollow glassware, such as a glass bottle, as described in my copending application, Serial No. 737,281, filed July 27, 1934, wherein is disclosed and claimed a bottle provided in its neck portion with an annular sealing pocket for receiving sealing instrumentalities providing a seal for the bottle closure, which latter may be of conventional form. Such a sealing pocket is preferably formed by and between an integral neck flange, which extends generally outwardly and thence upwardly along the bottle neck, and a portion of the exterior neck surface of the bottle, with the pocket having an upwardly opening mouth for receiving the sealing instrumentalities.

As conducive to a clear understanding of the invention to be described, it may be noted that according to my novel method of manufacturing a bottle provided with an annular sealing pocket about its neck portion, I may first mold the neck portion of the bottle while forming the parison in such manner that the neck portion is provided with an outwardly directed flange which extends generally in a plane normal to the axis of the bottle neck. Thereafter, the parison is expanded as by blowing in the conventional manner, and a glass article results which is generally in accordance with bottles of conventional construction, with the exception of the outwardly directed flange extending from the neck portion of the bottle. Thereafter, the flange may be reheated to flowing temperature and is thereupon reshaped to a cup formation as by turning its relatively outer portion upwardly and in spaced relation with respect to the bottle neck to form the sealing pocket as aforesaid. As will be hereinafter set forth, the reshaping of the flange is preferably effected by a spinning operation, although I do not wish to be limited in this respect as other practices for reshaping the flange may be utilized.

Alternatively, the neck pocket may be formed by blowing the flange to its annular cup formation during the operation of blowing the bottle. According to such practice as contemplated by me, the neck is molded, and the parison formed simultaneously therewith, in such manner that the neck has a thickened annular flange. Such flange and the adjacent neck portion may be reheated to the temperature of the parison, and upon blowing of the bottle the flange may be simultaneously reshaped by being blown into a suitable cavity of a flange finishing mold operating with the bottle finishing mold.

A description of one mode of operation for the carrying out of the present invention and of typical apparatus adapted for use in the performance of the steps thereof will now be given, reference being made to the accompanying drawings, in which—

Figs. 1 through 5 are diagrammatic and fragmentary views in section of apparatus used in carrying out certain steps of the present invention, such steps or stages resulting in the formation of a blown bottle illustrated in Fig. 6 and provided with a neck flange of the shape and general configuration prior to the stage of reshaping.

Figs. 7 and 8 are diagrammatic, fragmentary views of apparatus used in the performance of the steps of reheating the neck flange.

Figs. 9, 10 and 11 are diagrammatic, fragmentary views of apparatus adapted for use in the performance of the neck flange reshaping steps, such views illustrating the stages followed in reshaping the neck flanges of the bottle indicated in Fig. 6 and subsequent to the neck flange heating stage illustrated in Figs. 7 and 8 to its finished annular cup shape and position with respect to the outer neck surface of the bottle, whereby to form a neck pocket comprehended by the present invention. Figure 12 is a view of the finished article.

Referring to the drawings and particularly Figs. 1 through 6 thereof, reference character 10 (Fig. 1) indicates a receptacle for maintaining a supply of molten glass. This receptacle or container 10 for the molten glass is of conventional construction and has a discharge aperture 11 through which a discharge regulating element 12, such as a plunger or the like, is adapted to forcibly extrude a mass of the molten glass. The extruded mass forced through the discharge opening 11 is adapted to be operated on by shearing elements 13 which shear the extruded mass in predetermined quantity as to form a bottle of desired shape, thickness, and the like.

A parison forming mold generally designated at 14 is adapted to be brought under the discharge opening 11 of the reservoir or container 10, with the mold cavity extending coaxially therewith. Such forming mold 14 may be comprised by separable sections 15, 16. Beneath the forming mold is arranged the neck mold comprised as by separable sections 17, 18, the neck mold sections 17 and 18 being separable independently of the forming mold sections 15, 16, and vice versa. The sections 17 and 18 of the neck mold are adapted to overlie a neck finish pin cylinder 20 in which is mounted for reciprocation the neck finish pin 21.

Considering now the shape and configuration of the neck mold cavity generally indicated at 22, such may comprise a mouth bead cavity 23, a cylindrical cavity portion 24, a shoulder cavity 25 of greater diameter than the cavity portion 24, an undercut shoulder cavity 26 which defines with the cavity 25 a neck bead cavity 27, an annular flange cavity 28, a lower rest bead cavity 30, and a normal neck cavity portion 31. It will be understood that the mold cavity 22 may be modified without departing from the scope of the present invention; it being essential, however, that the annular flange cavity 28 be provided, such cavity being arranged to extend outwardly a substantial distance beyond the normal neck of the bottle; it being further essential to provide the undercut shoulder cavity 26 arranged intermediate the flange cavity 28 and the bottle mouth. The shape of the mouth bead cavity 23 and of the cylindrical portion cavity 24 may be changed in accordance with the particular type of closure to be utilized with the finished bottle. Thus, the bead cavity 23 suitable for the formation of a mouth bead utilized with crown cap closures may be eliminated, with the cylindrical cavity portion 24 extending to the bottle mouth, as would probably be the case where a closure of the stopper type is to be utilized. If a screw cap closure is intended, suitable thread cavities may be provided along the cavity portion 24.

As the forming mold sections 15, 16 and the underlying neck mold sections 17, 18 are closed and moved beneath and into axial alignment with the discharge aperture 11 of the molten glass reservoir 10, a mass of molten glass is deposited into the mold cavity as indicated in Fig. 2, the molten glass mass thereupon being supported on the tip of the neck finish pin 21 which is in its lowermost or retracted position. Thereupon, as indicated in Fig. 3, an air head 35 is moved over and down upon the mold sections 15, 16 and is sealed thereto by suitable means. Air pressure from a source of air pressure supply (not shown) is thereupon directed to the air head 35 through suitable connections 36, the pressure being directed against the relatively upper portion of the molten glass mass disposed in the mold cavity. Simultaneously with pressure being directed to the air head 35, the neck finish pin 21 is projected upwardly and acts to force the molten glass into the mold cavities and to shape and finish both the interior and exterior neck surfaces of the bottle. Pressure molding as aforesaid and pressure contact between the glass and the metal of the neck forming cavities acts to chill the glass whereby it retains its molded shape. As the neck is so formed, the upper portion of the molten mass is distributed throughout the cavity of the forming mold sections to form the parison or partially formed bottle blank.

With the neck of the bottle now formed, air pressure in the head 35 is relieved, following which the head is swung away from the forming mold 14, and the neck finish pin 21 is retracted to its Figs. 1-2 position. Thereupon the mold parts 15, 16, 17, 18 moving as a unit and containing the parison or partially formed bottle is inverted, and a finishing or blow mold constituted by the sections 37, 38 is swung into coaxially underlying position with respect to the aforesaid mold parts. The sections 15, 16 of the forming mold are now swung apart, with the neck mold sections 17, 18 gripping the molded neck portion of the partially formed bottle. Thereupon the neck mold sections 17, 18 and the finishing mold sections 37, 38 are given relative movement towards each other until the neck rest bead formed by the bead cavity 30 rests against the top surfaces of the finishing mold sections 37, 38. Upon closing of the latter sections to form the blow mold cavity and to support the parison, the neck mold sections 17, 18 are separated and moved out of position. Thereupon, an air head 40 (Fig. 5) connected with a suitable source of pressure (not shown) through connection 41 is brought over the neck portion of the bottle and in sealing relation with the now closed finishing mold sections 37, 38. Air pressure, effective against the parison cavity formed by the neck finish pin 21, acts against the still molten portion of the parison which, due to its weight and viscosity, has a tendency to stretch to the dotted line positions indicated in Fig. 5, and expands the parison by blowing the same into the body cavity 42 of the finishing or blow mold 37, 38. It will be understood that the pressure in the head 40 and within the blown body of the bottle is equalized and that such pressure acts equally on the exterior and interior chilled surfaces of the bottle neck. Accordingly, the molded neck portions are in no wise disturbed by the body blowing operation.

Pressure may be now relieved in the head 40 and the head swung up and away from the mold sections 37, 38, whereupon the said sections 37, 38 are separated and the resulting blown article removed therefrom.

By reference to Fig. 6 wherein is shown a blown bottle resulting from the stages of manufacture aforesaid, such a bottle has a conventional body portion and interior neck surface, and an exterior neck surface and configuration resulting from the neck molding operation aforesaid. Such exterior neck surface may be characterized by a mouth bead 23a, if the bottle is to be closed by a crown cap or the like, a smooth cylindrical surface 24a, oppositely related shoulders 25a, 26a, which define a neck bead 27a of diameter greater than the diameter of the cylindrical portion 24a, a circular outwardly directed flange 28a, and beneath the same a rest bead 30a.

As indicated hereinbefore, the neck surfaces 23a, 24a may be modified in accordance with the closure to be used with the bottle, as for example the neck bead 23a may be eliminated, and/or threads may be molded along the cylindrical portion 24a for securing a screw cap closure. The diameter of the mouth bead 23a or of the portion 24a, if the mouth bead 23a is not embodied, should be slightly less than the diameter of the neck bead 27a, whereby sealing instrumentalities cooperating with said neck bead 27a and/or with the shoulders 25a, 26a, defining the same may clear the mouth bead 23a and portion 24a of the neck. The diameter of the flange 28a will be such that when the flange is reshaped, as will be described hereinafter, the upper edge of the flange will extend above the shoulder 26a and to about the shoulder 25a. While the lower or rest bead 30a which is disposed beneath the flange 28a is desirable to provide a rest for the parison during the blowing operation and/or for strengthening purposes, such is not essential and may be eliminated.

Referring now to the reheating of the flange 28a, preliminary to the reshaping of said flange, reference is made to Figs. 7 and 8 wherein typical apparatus for reheating the flange to flowing temperatures is illustrated. Such apparatus may comprise a carrier 46, in the nature of a conveyor chain or equivalent mechanism, having secured thereto a cup clamp 46 from which extends a spindle 47 provided with a pinion 48 engaging with a rack 50. As the conveyor chain 45 is moved longitudinally in the direction of the arrow (Fig. 7), it will be evident that a bottle clamped in the cup 46 will be actuated longitudinally and also rotated about the axis of spindle 47.

Arranged adjacent the neck portion of the bottle and parallel to its path of travel, there is provided a longitudinal burner casting generally indicated at 52, the casting being provided with a plurality of angle jets 53. By reference to Fig. 8, the jets 53 are preferably arranged in upper and lower series, the upper series being inclined downwardly and the lower series being inclined upwardly. The upper and lower series of jets 53 are each preferably comprised of two jets arranged at different heights and of sufficient length whereby to distribute the flame across the upper and lower surfaces of the flange 28a. It will be understood that the arrangement of jets illustrated is suggestive only and that their arrangement and the number thereof may vary in accordance with the manufacturer's practice. As the bottle is moved longitudinally and is simultaneously rotated about its upright axis, the flange 28a of the bottle is moved along the angle jets 53 which direct a flame against the flange surfaces and function to bring the flange of the bottle to flowing temperature. In order that portions of the bottle adjacent the flange may be protected from the flame, upper and lower inclined guards 54, 55 are so disposed as to localize the flame of the jets on the flange 28a of the bottle.

As the bottle reaches the end of its path of travel as defined by the carrier 45, the clamp 46 is opened or otherwise released and the bottle removed therefrom for the flange reshaping operation, the stages of which are illustrated in Figs. 9, 10 and 11.

Considering now the reshaping apparatus, reference will first be made to Fig. 10 wherein the reference character 60 indicates generally a bottle clamp adapted to engage about the lower neck portion of the bottle and to hold the bottle in position so that its heated flange may be reshaped. Said bottle holding means 60 is adapted to hold the bottle in axial relation with respect to a reciprocable core cup 61 secured to a shaft 62, the said shaft 62 being held against rotation by suitable means. Rotatably mounted on the shaft 62 for reciprocable movement therewith is a tubular sleeve 63 adapted to be rotated by suitable means (not shown), the said sleeve carrying a thrust collar 64 floatably mounted on said sleeve 63 and capable of axial movement with respect thereto. Links 65 are pivotally connected to the thrust collar 64 and to the outer ends of the spinning arms 66. The said arms are fulcrumed intermediate their length as at 67 to a collar 68 rotatable on the shaft 62 with sleeve 63 and movable axially therewith. The lower ends of the reshaping arms 66 are advantageously formed to provide a nose 70 and a concave portion 71 extending thereabove. While two opposed arms 66 are illustrated, the number of such arms may vary as conditions and/or manufacturing practices demand.

In Fig. 9, the core cup 61 is illustrated in its raised position, with the reshaping arms 66 shown in their raised and relatively outward position.

Upon clamping the bottle in the clamp 60, the shaft 62 is lowered and such acts to project the cup 61 downwardly and over the bottle mouth until the lower edge 61a of the cup engages the upper surface of the flange 28a of the bottle. By reference to Fig. 10, the cup 61 is recessed in such manner that its inner diameter is substantially the diameter of the neck bead 27a of the bottle, the depth of the recess being advantageously such that when the lower edge 61a of the cup engages the upper surface of the bottle flange 28a, the bottle mouth bead 23a (or mouth edge) is snugly held within a cavity 61b formed in the upper recess portion of the cup 61. The lower outer surface 61c of the cup is shaped throughout its periphery to the thickness and configuration of the pocket to be formed, it being understood that the lower edge 61a and surface 61c provides a core or mandrel about which the flange 28a is reshaped.

Referring to Fig. 10, this figure illustrates the core cup 61 in its down position and with the reshaping arms 66 beginning their inward movement. Such movement is effected by causing downward movement of the thrust collar 64 which acts through links 65 to urge the upper ends of the reshaping arms 66 outwardly and to swing the lower nosed ends thereof inwardly against the relatively outer periphery of the bottle flange 28a. This inwardly swinging movement of the arms 66 is accompanied by a relatively high speed rotative movement of the arms due to their fulcrum connection with collar 68 driven by sleeve 63, such rotation being of the order of 200 R. P. M. although this may vary in accordance with the manufacturer's practice.

With the flange portion 28a of the bottle at a flowing temperature, the combined compressive and rotative action of the nose and curved surfaces 70, 71 of the reshaping arms 66 functions to spin the bottle flange 28a upwardly over the core cup edge 61a and inwardly against the lower outer core surface 61c (see Fig. 11). In such manner, the flange is reshaped to a cup formation, with the spinning action of the arms 66 also acting to distribute the flowing material of the flange equally, thus providing a finished cup flange of uniform height and thickness.

Upon completion of the spinning operation, the thrust collar 64 is raised, such acting to swing the lower ends of the reshaping arms 66 outwardly. Thereupon shaft 62 is raised, and such withdraws the cup 61 to a position above the bottle mouth, generally to a position indicated in Fig. 9, whereupon the bottle clamp 60 may be released and the completed article illustrated in Fig. 12 removed from the spinning machine. The bottle is now fully formed throughout and the reshaped flange thereof, due to chilling, maintains its cup formation resulting from the spinning operation. Thereupon the bottle may be placed in a tempering lehr and tempered in accordance with the conventional tempering practices.

Preferably, the cup 61 and the reshaping arms 60 which contact the reheated surfaces of the bottle flange 28a are constructed from cherry wood, to obviate premature chilling of the glass of the flange prior to its reshaping. While I have illustrated the bottle being held, during the reshaping operation, in upright position, with the cup 61 and reshaping arms 66 movable downwardly, it will be understood that the bottle flange 28a may be reshaped with the bottle held in inverted position and with the cup 61 and reshaping arms 66 movable upwardly and operating to spin the flange 28a downwardly, and all such modifications and variations are intended to be included within the scope of the present invention. With the bottle so held in inverted position as above suggested, it is intended that the natural fall or sag of the flange due to its flowing state shall assist the action of the spinning or reshaping arms 66.

While the aforesaid description relates to the construction of a bottle having an annular neck pocket, it will be understood that the herein described mode of operation may be utilized in the manufacture of glassware generally, such as bottles of other shape and size than illustrated, glass containers, jars and the like. It will further be evident that the above described mode of reshaping a glass flange or the like has wider application than to the formation of an annular cup on a bottle neck, and all such other applications wherein the present mode is useful, as would appear to one skilled in the art, are intended to be embraced within the spirit and scope of the appended claims. Further, various other modifications in the stages of the above described mode or modes of operation may be resorted to within the scope of the present invention.

I claim:

1. In the manufacture of bottles or like ware, the method which consists in the steps of shaping and finishing the neck portion of the ware and simultaneously therewith forming a solid flange which extends outwardly from the exterior surface of said neck portion, blowing the body portion of the ware, reheating the upper and lower faces of the flange, and thereupon turning the flange relatively upwardly along the ware neck into annular pocket-forming relation with the neck.

2. In the manufacture of bottles or like ware, the method which consists in the steps of shaping and finishing the neck portion of the ware and simultaneously therewith forming a solid flange which extends outwardly from the exterior surface of said neck portion, blowing the body portion of the ware, reheating the upper and lower faces of the flange, and bending the relatively outer portion of the flange inwardly and upwardly along the neck whereby the flange forms with a portion of the exterior of the neck surface an annular pocket.

3. In the manufacture of bottles or like ware, the method which consists in the steps of shaping and finishing the neck portion of the ware and simultaneously therewith forming a solid flange which extends outwardly from the exterior surface of said neck portion, blowing the body portion of the ware, reheating the upper and lower faces of the flange, and thereupon spinning a portion of the flange upwardly along the neck and in spaced relation with respect thereto whereby the flange forms with a portion of the exterior neck surface an annular neck pocket.

CHARLES W. JOHNSON.